Patented Feb. 8, 1927.

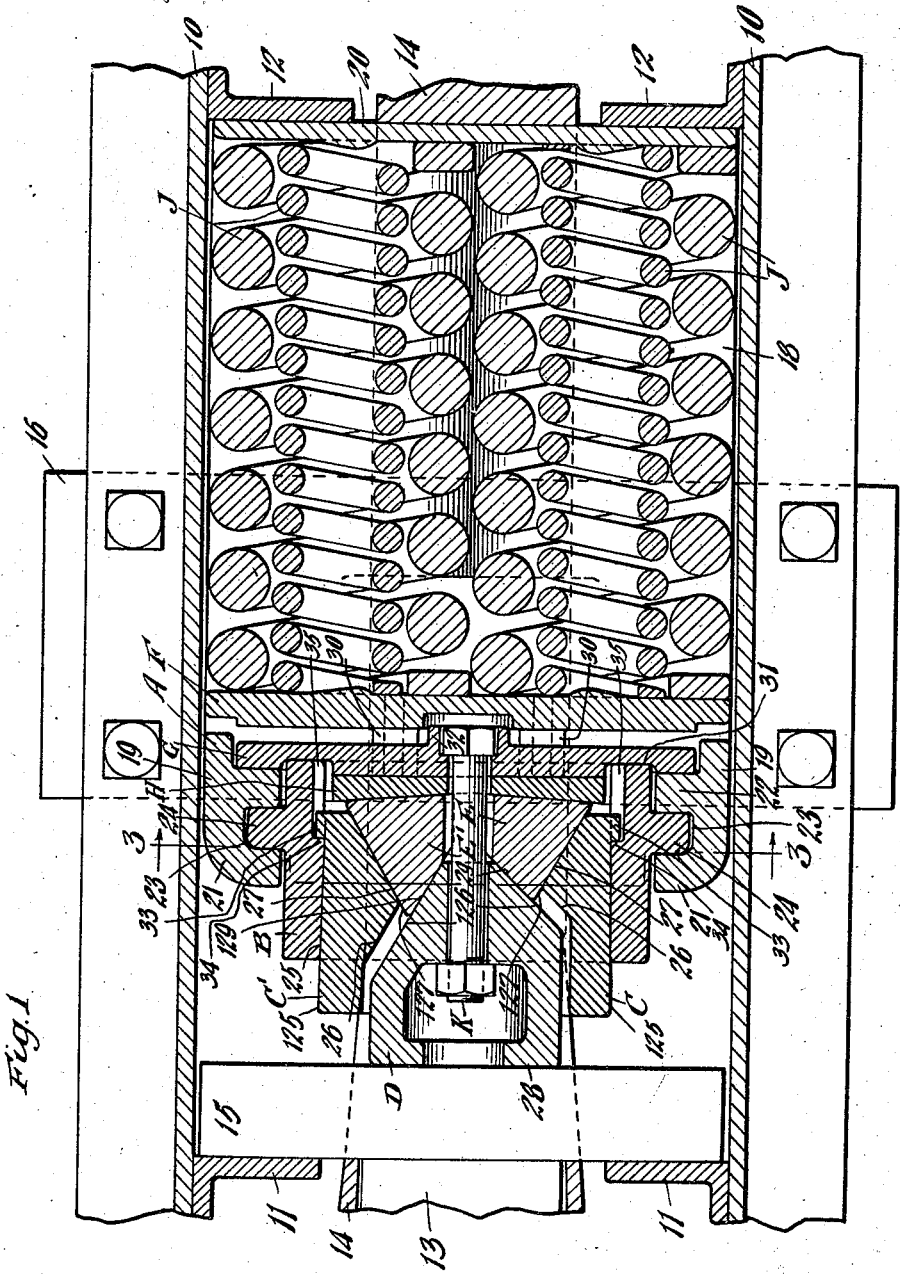

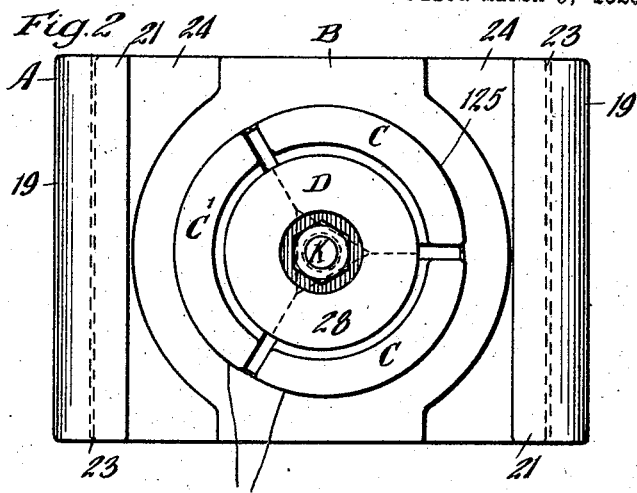
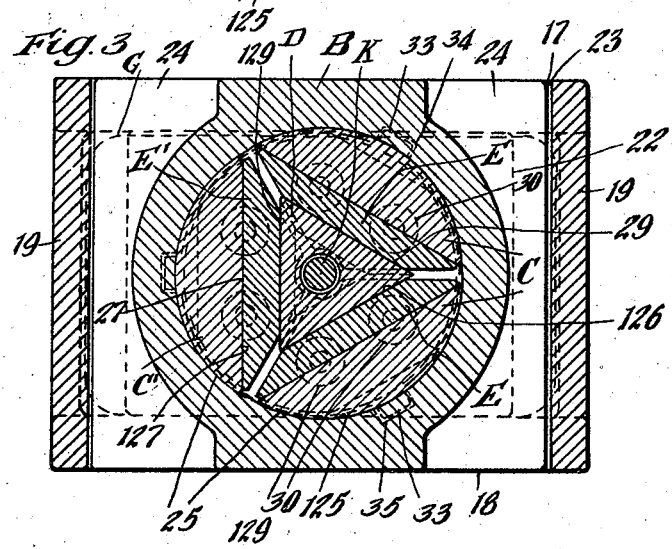
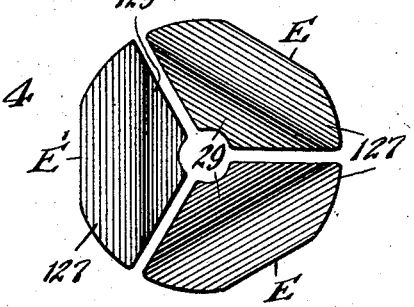

1,616,758

UNITED STATES PATENT OFFICE.

JOHN F. O'CONNOR, OF CHICAGO, ILLINOIS, ASSIGNOR TO W. H. MINER, INC., OF CHICAGO, ILLINOIS, A CORPORATION OF DELAWARE.

FRICTION SHOCK-ABSORBING MECHANISM.

Application filed March 9, 1925. Serial No. 13,947.

This invention relates to improvements in friction shock absorbing mechanisms.

One object of the invention is to provide a friction shock absorbing mechanism especially adapted for railway draft riggings, wherein are obtained light resistance during initial or preliminary action, and a change into a heavier final frictional resistance during the compression stroke.

Another object of the invention is to provide, in a mechanism of the character indicated, a wedge system so arranged that during initial action and for a predetermined portion of the compression stroke, true wedge or spreading action is absent, during which time the actuating force is transmitted from the main wedge through the diverging friction blocks to the spring resistance, a true wedging or spreading action being set up after a predetermined compression and upon engagement of the main wedge and the friction shoes.

Other objects of the invention will more fully and clearly appear from the description and claims hereinafter following.

In the drawings, forming a part of this specification, Figure 1 is a longitudinal, sectional view of a portion of a railway draft rigging showing my improvements in connection therewith, the section through the friction elements corresponding to two intersecting planes at an angle of 120° to each other. Figure 2 is a front and elevational view of the shock absorbing mechanism proper. Figure 3 is a vertical, transverse, sectional view corresponding substantially to the line 3—3 of Figure 1. And Figure 4 is a detailed, and elevational view of three intermediate friction blocks used in connection with my improved mechanism.

In said drawings, 10—10 indicate channel-shaped center or draft sills, to the inner faces of which are secured front stop lugs 11—11 and rear stop lugs 12—12. The inner end of the draw bar is indicated at 13 to which is connected a hooded yoke 14 of well known form. The shock absorbing mechanism proper, as well as a front follower 15, is disposed within the yoke. The yoke and parts therewithin are operatively supported by a detachable saddle plate 16 secured to the draft sills.

The improved shock absorbing mechanism proper, as shown, comprises broadly, a spring cage casting A; a friction shell B; three friction-shoes C, C and C'; a wedge block D; three intermediate friction blocks E, E and E'; a main spring follower F; an auxiliary follower plate G; a wear plate H; twin arranged main springs J; and a retainer bolt K.

The spring cage casting A is of rectangular box-like form having horizontally disposed top and bottom walls 17 and 18, vertical side walls 19—19 and a transverse wall 20. The end wall 20 bears directly on the rear stop lugs 12 and functions in the manner of the usual follower. At the forward end, the side walls 19 are provided with opposed inwardly extending flanges 21. Spaced inwardly from the flanges are a pair of vertically disposed ribs 22, the flanges and ribs together defining vertical guide slots 23, for a purpose hereinafter described. As clearly shown in Figure 1, the sides of the spring cage A are left open to permit lateral insertion of the main springs J.

The friction shell B is of substantially cylindrical form and has a pair of lateral flanges 24 adjacent the rear end thereof, the flanges being adapted to be received in the slots 23 of the casing A to retain the friction shell against longitudinal movement and hold the same in assembled relation with the cage. The friction shell is provided with three substantially cylindrical interior friction surfaces 25, converging slightly inwardly of the shell, the surfaces being so disposed that they will form a substantially complete circle at the inner end of the shell.

The three friction shoes C, C and C' which are preferably in the form of castings are of like construction except as hereinafter pointed out. Each shoe C is formed with an outer true cylindrical friction surface 125, adapted to cooperate with one of the friction surfaces 25 of the friction shell. Each shoe has a pair of inclined faces 26 and 27 on the side nearest the longitudinal axis of the mechanism, the inclined faces 26 and 27 being arranged respectively at the outer and inner ends of the shoe. As clearly shown in Figure 1, the inclined faces 27 are inclined at a sharper angle to the longitudinal axis of the gear than are the faces 26. The faces 26 of the two shoes C extend at a relatively blunt releasing angle with respect to the axis of the mechanism, whereas the face 26 of the shoe C' extends at a relatively keen angle thereto.

The wedge D, as shown, is in the form of a cast block, suitably cored and having a flat outer end face 28 bearing directly on the inner surface of the front follower 15. At the inner end, the wedge block D has three wedge faces 126—126, symmetrically arranged about the axis of the mechanism. Two of the wedge faces 126 co-operate with the wedge faces 26 of the shoes C, and are also inclined at a relatively blunt releasing angle with reference to the axis of the mechanism, while the remaining wedge face 126 cooperates with the wedge face 26 of the shoes C' and is disposed at a relatively keen, wedge angle to said axis.

The intermediate friction blocks E, E and E' are in the form of castings and of like construction except as hereinafter pointed out. Each of the two blocks E has an outer face 127 correspondingly inclined to and adapted to co-operate with the face 27 of one of the friction shoes C and the block E' also has an outer face 127 correspondingly inclined to and adapted to co-operate with the face 27 of the friction block C'. The two friction shoes E each have an inner face 29 correspondingly inclined to and adapted to co-operate with the corresponding blunt face 126 of the wedge block D, and the friction block E' also has an inner face 129 correspondingly inclined to and adapted to co-operate with the keen wedge face 126 of the block D.

The main spring follower F is in the form of a heavy rectangular plate, and bears directly on the outer ends of the twin arranged spring resistance elements J. The spring follower F has a plurality of forwardly projecting bosses 30, symmetrically arranged around the axis of the mechanism, six bosses 30 being so shown in the embodiment of the invention as illustrated in the drawings.

The auxiliary follower G, which is also in the form of a rectangular plate, is provided with an annular groove 31 at the front side thereof, adapted to accommodate the inner end of the friction shell. As clearly shown in Figure 1, the outer edge portion of the follower G normally engages the rear faces of the ribs 22. The plate G is of such a height as to be freely accommodated between the top and bottom walls 17 and 18 of the spring cage.

The wear plate H, which is preferably in the form of a steel disc is interposed between the auxiliary follower and the inner ends of the intermediate friction blocks E, E and E', the outer face of the plate being inclined outwardly laterally from the axis of the gear and engaging the correspondingly inclined ends of the intermediate friction blocks.

The parts of the mechanism are held in assembled relation and maintained of over-all uniform length by the retainer bolt K, which has its front and rear ends anchored respectively to the wedge block D and the auxiliary wedge follower G, the head at the rear end of the bolt being seated in a recessed boss 32 at the rear side of the follower and the nut at the forward end of the bolt being accommodated within the hollow portion of the wedge block. When the parts are assembled, the retainer bolt, in conjunction with the auxiliary follower G, wedge-friction-shoes, intermediate friction blocks and wedge, serves to prevent separation of the friction shell in a vertical direction with reference to the spring cage casting, the auxiliary follower G being held against movement in a vertical plane between the top and bottom walls 17 and 18 of the spring cage. Outward movement of the friction shoes C, C and C' with reference to the friction shell is limited by lugs 33 engaging shoulders 34 on the friction shell, each shoe being preferably provided with a single lug 33, accommodated in a slot 35, having a limiting shoulder 34 at the front end thereof.

As clearly shown in Figure 1, the front ends of the bosses 30 of the follower F bear directly on the rear surface of the wear plate H, extending through the auxiliary followers G, the latter being provided with openings to accommodate the same. The lugs serve to maintain the spring follower F in spaced relation with reference to the auxiliary follower G. The clearance provided between the spring follower F and the auxiliary follower G permits outward movement of the former with reference to the latter as the various wedge and friction faces become worn.

The main spring resistance J comprises twin arranged elements, each including a heavy outer coil, and a relatively lighter inner coil, the opposite ends of the coils bearing respectively on the spring follower F and the inner surface of the end wall 20 of the spring cage casting.

With the parts in normal condition as shown in Figure 1, it is evident that there will be no true wedging or spreading action from the wedge D to the shoes C, C and C', due to the intermediate friction blocks holding the wedge in spaced relation to the shoes. During compression of the mechanism, the wedge D will be carried inwardly with the follower 15 and the actuating force will be transmitted through the intermediate elements E, E and E', wear plate H and spring follower F to the main springs J. Due to the wedging action between the wedge D and the intermediate friction blocks, the latter will be forced laterally apart, slipping on the faces 27 of the friction-shoes. It will be evident that inasmuch as the faces 27 of the friction shoes diverge inwardly of the mechanism, a differential action will be had, the spring follower F being moved inwardly at a lesser rate than the wedge G thereby effecting a relatively slow compression of the main spring resistance elements J. The parts are preferably so proportioned that the follower F will, during this time, move a distance about one-half the movement of the wedge. The preliminary action just described will continue until the blocks E, E and E' have been moved inwardly to such an extent that the wedge faces 126 of the wedge block G will come into engagement with the wedge faces 26 of the shoes, whereupon the shoes will be forced laterally apart into intimate contact with the friction surfaces of the shell and carried rearwardly in unison with the intermediate friction blocks, wear plate H and follower F. During the remainder of the compression stroke, the parts just referred to will be carried inwardly practically as a unit, there being substantially little further relative movement between the intermediate friction blocks and the friction-wedge-shoes except that due to the taper of the friction shell. This action will continue either until the actuating force is reduced, or until the main follower 15 comes into engagement with the outer end of the friction shell, whereupon the pressure will be transmitted through the friction shell and spring cage casting A, directly to the corresponding stop lugs of the draft sills. Due to the employment of the blunt and keen sets of wedge faces on the shoes and main wedge, I obtain a very high wedging action during the latter part of the compression stroke, since the keen angle wedge faces may be made relatively acute without danger of the parts sticking, the blunt wedge faces acting more or less as "safety valves" to prevent sticking.

It will be understood by those skilled in the art that my particular improvements are capable of use in a mechanism employing either the blunt and keen angle system of wedge faces, or wedge faces which are all of the same angle with respect to the axis of the mechanism.

I have herein shown and described what I now consider the preferred manner of carrying out my invention, but the same is merely illustrative and I contemplate all changes and modifications that come within the scope of the claims appended hereto.

I claim:

1. In a friction shock absorbing mechanism, the combination with a friction shell having interior opposed friction surfaces; of a spring resistance; a plurality of friction-shoes co-operable with said friction surfaces; a pressure-transmitting wedge means; and separate means interposed between the wedge and shoes and having lateral engagement therewith for holding the former from effective wedging engagement with the shoes under full release, but permitting the wedge to engage the shoes after a predetermined compression of the mechanism.

2. In a friction shock absorbing mechanism, the combination with a friction shell having interior opposed friction surfaces; of a spring resistance; a plurality of friction-shoes co-operable with said friction surfaces; a wedge-pressure-transmitting means; and wedge friction blocks interposed between said wedge - pressure - transmitting means and shoes to hold the former normally free from cooperating wedging action with said shoes, but permitting said wedge to engage and spread said shoes after a predetermined compression of the spring resistance.

3. In a friction shock absorbing mechanism, the combination with a friction shell having interior friction surfaces; of a plurality of friction-wedge-shoes co-operating with the friction surfaces of the shell, each of said shoes having a pair of wedge faces; a main spring resistance; wedge-friction blocks for holding said wedge normally out of contact with the friction shoes, said blocks each having a wedge face co-operating with one of the wedge faces of one of said shoes.

4. In a friction shock absorbing mechanism, the combination with a column element having friction surfaces; of a plurality of friction-shoes co-operating with said column element, said shoes each having a wedge face and a friction face inclined at an angle to the axis of the mechanism; friction blocks each having a wedge face and a friction face, said last named face co-operating with the friction face of one of said shoes; a pressure-transmitting member having a plurality of wedge faces, each of said last named wedge faces having a section thereof engaging the wedge face of one of said friction blocks and a section normally spaced from the wedge face of one of said shoes and adapted to engage the same after a predetermined compression of the mechanism; and a main spring resistance opposing movement of said shoes and blocks inwardly of the mechanism.

5. In a friction shock absorbing mechanism, the combination with a column element having friction surfaces; of a plurality of friction-shoes co-operating with said column element, said shoes each having an outer wedge face and an inner friction face, said last named face being inclined reversely to said outer face; a wedge-pressure-transmitting member having a plurality of wedge faces adapted to co-operate with the wedge faces of said shoes after a predetermined compression of the mechanism; friction elements interposed between each wedge face of said pressure-transmitting member and the inner face of the corresponding shoe and adapted to slide thereon during initial compression of the mechanism, said friction elements normally holding said wedge member spaced from the shoes; and a main spring resistance opposing inward movement of said shoes and elements.

6. In a friction shock absorbing mechanism, the combination with a friction shell having interior, inwardly converging friction surfaces; of a plurality of friction-shoes co-operating with the friction surfaces of the shell, said shoes having outer wedge faces converging inwardly of the mechanism and inner faces diverging inwardly of the mechanism; a pressure-transmitting member having a plurality of wedge faces adapted to co-operate with the wedge faces of the shoes; a plurality of friction elements each having a friction and a wedge face, the friction faces of said elements engaging the inner faces of the shoes and the wedge faces thereof engaging the wedge faces of said member; and a main spring resisting movement of said shoes and elements, said spring normally holding said elements projected to hold said member free from effective wedging engagement with the shoes when the mechanism is in full release and permitting co-operative engagement of said member and shoes after a predetermined relative movement of said elements and shoes.

7. In a friction shock absorbing mechanism, the combination with a friction column element; of a main spring resistance; and a friction wedge system co-operating with said column element, said system including wedge-friction-shoes, friction blocks and a main wedge member, said friction blocks holding said wedge member out of contact with the shoes during a predetermined initial portion of the compression stroke.

8. In a friction shock absorbing mechanism, the combination with a friction shell; a spring resistance within the shell; a wedge-friction system co-operating with the shell, said system including friction shoes, a pressure-transmitting wedge and differential elements adapted to initially receive the actuating force directly from the wedge and hold the wedge out of engagement with the shoes during initial action of the mechanism and permit operative wedging engagement of said wedge and shoes after a predetermined differential movement of said element and wedge to transmit the actuating force directly to the shoes.

9. In a friction shock absorbing mechanism, the combination with a friction element; of a friction wedge system co-operating with said element, said system including a wedge-pressure-transmitting device and co-acting friction members having differential movement, certain of which are adapted to initially receive the actuating force from the wedge and after a predetermined action of the mechanism effect transfer of the actuating force to the remaining members; and means yieldingly resisting movement of said members.

10. In a friction shock absorbing mechanism, the combination with a spring cage; of a spring resistance within said cage; a friction shell, said shell and cage having co-operating means thereon for preventing relative longitudinal movement thereof; wedge friction means co-operating with the shell; a main spring follower; and an auxiliary follower within the cage, said last named follower being held against displacement in a plane at right angles to the axis of the mechanism; and anchoring means carried by said last named follower for preventing relative movement of the shell and follower in parallel planes.

In witness that I claim the foregoing I have hereunto subscribed my name this 18th day of February, 1925.

JOHN F. O'CONNOR.